United States Patent [19]

Doguchi et al.

[11] Patent Number: 4,620,355

[45] Date of Patent: Nov. 4, 1986

[54] METHOD FOR MANUFACTURING A HEAT INSULATING SASH BAR

[75] Inventors: Nobushige Doguchi; Yoshitaka Nagai, both of Toyama, Japan

[73] Assignee: Yoshida Kogyo K. K., Tokyo, Japan

[21] Appl. No.: 379,289

[22] Filed: May 18, 1982

[30] Foreign Application Priority Data

Jun. 1, 1981 [JP] Japan .................................. 56-83958
Jun. 1, 1981 [JP] Japan .................................. 56-83959

[51] Int. Cl.[4] .............................................. B23P 17/00
[52] U.S. Cl. ...................................................... 29/418
[58] Field of Search .................. 29/418, 155 R, 527.1; 52/403, 729, 730, 731, 732; 49/DIG. 1

[56] References Cited

U.S. PATENT DOCUMENTS 3,992,769 11/1976 Jackson ................................ 29/418
4,128,934 12/1978 Doring ................................. 29/418
4,185,439 1/1986 Bischlipp et al. ..................... 29/418
4,330,919 5/1982 Bischlipp et al. ..................... 29/418
4,342,144 8/1982 Doguchi ............................... 29/418

*Primary Examiner*—Mark Rosenbaum
*Assistant Examiner*—Steven Nichols
*Attorney, Agent, or Firm*—Hill, Van Santen, Steadman & Simpson

[57] ABSTRACT

The invention provides a novel method for manufacturing a heat insulating sash bar comprising two face members connected together with two connecting members formed of a heat insulating material which is pourable and is cured or solidified after impregnating the space between the face members of a bar material of, for example, aluminum composed of two oppositely positioned face members connected together with at least one inner connecting part to have, for example, a H-wise cross section and provided with one or two pairs of inwardly extending flanges each on one of the face members. A belt-like strip of sheet made of a heat insulating material is placed on and bridging a pair of the flanges to form a groove-like channel with the strip as the bottom and the face members as the side walls and, after filling the groove-like channel with the pourable heat insulating material to connect the face members, the inner connecting part is at least partly cut off over whole length to thermally isolate the face members from each other. Thereafter, another strip of sheet is placed on the bridging the other pair of the flanges to form a second groove-like channel including the sections of the inner connecting part cut off and the second groove-like channel is filled with the pourable heat insulating material to cover and protect the sections of the inner connecting part from corrosion by the atmospheric influence.

2 Claims, 22 Drawing Figures

METHOD FOR MANUFACTURING A HEAT INSULATING SASH BAR

BACKGROUND OF THE INVENTION

The present invention relates to a method for manufacturing a heat insulating sash bar for window sash or, more particularly, to a method for manufacturing a heat insulating sash bar of which remarkably improved heat insulation is obtained between the face plates of the sash bar, one facing the inside of the room and the other facing the outside of the room, as connected with connecting members of a heat insulating material in such a manner as to form a hollow space surrounded by the face plates and the heat insulating connecting members.

As is well known, many of the modern window sashes are framed with sash bars made of a metal such as aluminum and shaped by extruding in the form of bar materials. When such window sashes are to be used in severe climatic conditions, there may be a problem in the use of an integrally shaped metal-made sash bar in respect of the heat insulation between inside and outside of the room since the heat conduction through the integrally shaped sash bars is not negligibly small due to the high heat conductivity of aluminum or the like metal of which the sash bar is made.

In this connection, it is desirable that the two oppositely positioned face plates forming the sash bar, one facing the inside of the room and the other facing the outside of the room, are not integral by isolated thermally from each other with connecting members made of a heat insulating material. In the prior art, various methods have been proposed for manufacturing such a heat insulating sash bar. For example, an integral bar material having an approximately H-wise cross section, composed of two oppositely facing face members connected with an inner connecting part to form at least one groove-like channel one one side of the connecting part, is shaped by extrusion and the groove-like channel is filled with a pourable heat insulating material to be cured in situ followed by longitudinally removing at least part of the connecting part by cutting off by use of a cutter or by tearing off at the reverse side of the heat insulating material to thermally isolate the two oppositely positioned face members.

In the above described conventional method for manufacturing a heat insulating sash bar, it is sometimes unavoidable that the heat insulating material which has been cured in contact with the inner connecting part, is more or less shaved off by the blade of the cutter when the cutter blade is thrusted into the connecting part and the thus formed shaving dusts electrostatically charged during the cutting work adhere to the outer surface of the bar material. Therefore, such adhering dusts of the heat insulating material must be removed with great consumption of time and labor. In addition, shaving of the heat insulating material with the cutter blade may cause cracking or fissures in the heat insulating material resulting in decrease of the connecting strength between the face members through the heat insulating material as the connecting member.

In order to avoid thrusting of the cutter blade into the heat insulating material, two parallel incision lines are formed on the connecting part and the portion between the incision lines is removd by tearing off. This method of tearing off is also not free from the problem caused by the adhesive bonding between the heat insulating material and the connecting part to be removed.

A further problem in the above described conventional method is that, since the surface of the section formed by the removal of part of the connecting part by cutting or tearing off is exposed bare to the outer atmosphere, corrosion of the metal sash bar readily starts at this surface of section by the influence of the atmospheric moisture because the surface of section is not provided with any surface protective layer different from the other surfaces of the bar material provided in advance with a protective coating layer formed, for example, by anodic oxidation.

A remedy for the above problem of the exposed surface of section is disclosed in Japanese Patent Publication No. 56-1434 in which a second impregnation with the heat insulating material is undertaken to cover the surface of section after a part of the connecting part has been removed by cutting off. This method is indeed effective in protecting the surface of section from corrosion but the other problems described above are left unsolved. Furthermore, the second impregnation with the pourable heat insulating material in this method is performed at the side of the connecting part reverse to the first impregnation with the heat insulating material so that no hollow space can be retained with the bar material. Therefore, an extremely large volume of the heat insulating material is used to fill up the space within the bar material resulting in disadvantages not only due to the economical problem by the large costs for the heat insulating material but also due to the difficulty in manufacturing and handling by the excessively heavy weight of the sash bar, especially, when the sash bar is large in the face measure.

SUMMARY OF THE INVENTION

It is therefore an object of the present invention to provide a novel method for manufacturing a heat insulating sash bar of the above described type, in which the connecting part of the bar material, which is to be removed after impregnation of the groove-like channel with the heat insulating material to connect the face members, can be cut off without shaving the heat insulating material by the cutter blade and, in addition, the surface of section formed by cutting off of the connecting part of the bar material can be covered with the heat insulating material impregnating the groove-like channel by pouring to connect the face members.

Another object of the invention is to provide a method for manufacturing a heat insulating sash bar which can be obtained easily and economically irrespective of the size thereof in the face measure.

Thus, the method of the present invention for manufacturing a heat insulating sash bar comprising two oppositely positioned face members connected with two connecting members made of a heat insulating material therebetween comprises the steps of (a) placing a first belt-like strip of sheet made of a heat insulating material on and bridging a first pair of two oppositely positioned intermediate flanges each one of the face members of a bar material having an approximately H-wise cross section as a whole as composed of two oppositely positioned face members connected integrally with at least one inner connecting part and opening outwardly on both sides of the connecting part, each of the face members being provided with two intermediate flanges on the same side relative to the connecting part to form the first pair of the intermediate flanges remoter from the connecting part and a second pair of the intermediate flanges closer to but not in direct contact with the connecting part with the respective oppositely positioned intermediate flanges on the other face member, to form a first groove-like channel opening at a side of the connecting part with the first belt-like strip of sheet as the bottom and the two face plates of the face members as the side walls, (b) filling the first groove-like channel with a heat insulating material to connect the face members with each other, (c) removing at least partly the connecting part over whole length thereof, (d) placing a second belt-like strip of sheet made of a heat insulating material on and bridging the second pair of the intermediate flanges to form a second groove-like channel including the sections of the connecting part and opening at the other side of the connecting part with the second belt-like strip of sheet as the bottom and the two face plates of the face members as the side walls, and (e) filling the second groove-like channel with a heat insulating material to connect the face members with each other and to cover the sections of the connecting part.

It is of course that, apart from the above described typical embodiment, a variety of modifications are included within the scope of the present invention, in particular, with respet to the cross sectional configuration of the starting bar material.

DETAILED DESCRIPTION OF THE PREFERRED EMBODIMENTS

The method of the present invention is now described in detail with reference to the accompanying drawing.

Figure 1A:
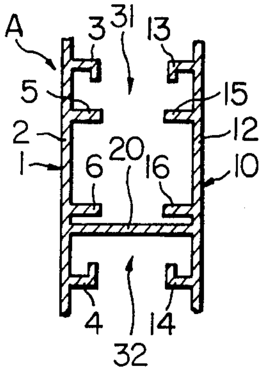
FIGS. 1*a* to 1*f* each illustrate a step of the inventive method starting with a bar material having an approximately H-wise cross section by the cross section of the sash bar.

FIGS. 1*a* to 1*f* each illustrate a step of a typical embodiment of the inventive method by the cross section of the sash bar. FIG. 1*a* is a cross sectional view of the starting bar material A made of, for example, aluminum shaped integrally by the technique of extrusion. The cross sectional configuration of the bar material A is approximately H-wise as a whole as composed of two oppositely positioned face members 1, 10 connected together with an inner connecting part 20 forming two groove-like channels 31, 32 on each side thereof opening to the different sides. Each of the face members 1, 10 is formed of a face plate 2 or 12 provided with two peripheral flanges 3, 4 or 13, 14 at or near the peripheries thereof and two intermediate shelf-like flanges 5, 6 or 15, 16. It is noted that these intermediate flanges 5, 6 and 15, 16 are positioned at the same side of the connecting part 20, the flanges 5, 15 being remoter from the connecting part 20 and the flanges 6, 16 being closer to the connecting part but not in direct contact therewith.

Figure 1B:
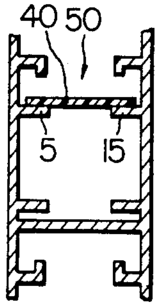

The first step is, as is illustrated in FIG. 1*b*, placing a belt-like strip of sheet 40 made of a heat insulating material on and bridging the intermediate flanges 5, 15, remoter ones from the connecting part 20, to form a somewhat narrowed groove-like channel 50 opening outwardly.

Figure 1C:
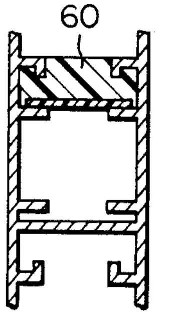

The second step is, as is illustrated in FIG. 1*c*, the impregnation of this groove-like channel 50 with a pourable heat insulating material 60 which may be a prepolymer of a thermo-setting resin or a melt of a thermoplastic resin and cured or solidified in situ in the groove-like channel 50.

Figure 1D:
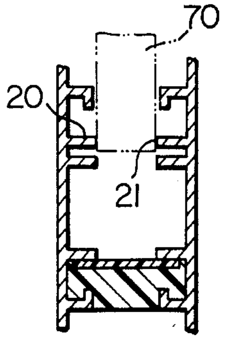

The third step is, as is shown in FIG. 1*d*, removal of at least part of the inner connecting part 20 over whole length thereof. This is performed, if convenient, by turning the bar material A filled in the first groove-like channel 50 with the pourable heat insulating material 60 upside down and trusting a cutter 70 into the other groove-like channel 32 formed between the inner connecting part 20 and a pair of the peripheral flanges 4, 14 to form a gap between the sections 21, 21 of the connecting part 20 whereby the two oppositely positioned face members 1, 10 are thermally isolated from each other by being joined together only with the heat insulating material 60 in the first groove-like channel 50. It is of course optional that, instead of cutting off the inner connecting part 20 with a cutter 70, a pair of parallel incision lines are formed in advance on the inner connecting part 20 over whole length thereof and the portion between the incision lines is removed by tearing off.

Figure 1E:
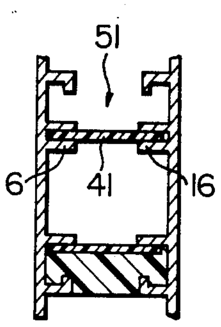

The fourth step is, as is shown in FIG. 1*e*, placing a second belt-like strip of sheet 41 made of a heat insulating material, which may be the same as or similar to that of the first strip of sheet 40, on and bridging the second pair of the intermediate flanges 6, 16 but below the sections 21, 21 of the inner connecting part 20 to form a second groove-like channel 51 having the second strip of sheet 41 as the bottom and the oppositely positioned face plates 2, 12 as the side walls.

Figure 1F:
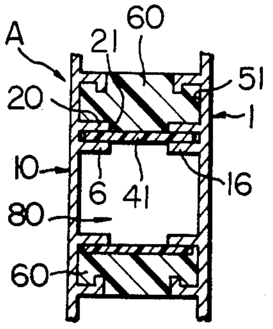

The last step is, as is shown in FIG. 1*f*, the impregnation of the thus formed second groove-like channel 51 with a pourable heat insulating material 60 which may be the same material as used for filling the first groove-like channel 50 and is cured and solidified in situ in the second groove-like channel 51. As is readily understood, the sections 21, 21 of the inner connecting part 20 are completely covered by this heat insulating material 60 filling the second groove-like channel 51 so that the surface of the sections 21, 21 is shielded and protected from the atmosphere not to cause corrosion even when the surface of the sections 21, 21 is not provided with surface protection such as the oxide film of aluminum formed by anodization.

The thus finished heat insulating sash bar is composed of the two oppositely positioned face members 1, 10 thermally isolated from each other but connected together with the heat insulating material 60 filling the two groove-like channels 50, 51 comprising a hollow space 80 therebetween. The volume of this hollow space 80 can be as large as desired contributing to the reduction of the overall weight of the sash bar and to the saving of the heat insulating material 60 with great economical advantages in the costs. Therefore, even a heat insulating sash bar of a large size in the face measure can be manufactured easily and inexpensively.

Figure 2:
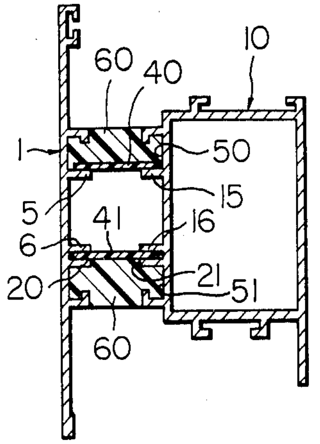
FIG. 2 is a cross sectional view of a sash bar manufactured by the inventive method starting with a bar material of which one of the face members has a box-like configuration.

FIG. 2 illustrates a cross section of another heat insulating sash basr which is a modification of the sash bar illustrated in FIGS. 1*a* to 1*f* and can be manufactured in just the same manner. Different from the face members 1, 10 in FIGS. 1*a* to 1*f*, one of the face members 10 in FIG. 2 has a tubular configuration of rectangular cross section as a whole comprising a hollow space therein. Otherwise, the relative positions of the flanges and the inner connecting part are much the same as in the sash bar illustrated in FIGS. 1*a* to 1*f* so that it may be useless to describe the manufacturing steps in detail.

FIGS. 3*a* to 3*e* each illustrate one of the successive steps for manufacturing a heat insulating sash bar by the cross section which is a further modification of the sash bar illustrated in FIGS. 1*a* to 1*f*. In this case, the starting bar material has two inner connecting parts 20, 20′ each at a position between the pair of the intermediate flanges 6, 16 and the pair of the peripheral flanges 4, 14 or between the intermediate flanges 5, 15 and the peripheral flanges 3, 13, respectively.

Figure 3A:
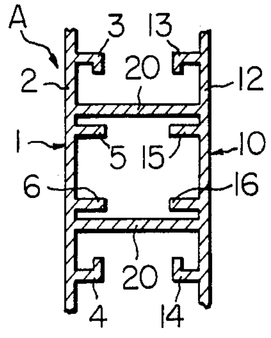
FIGS. 3*a* to 3*e* each illustrate a step of the inventive method starting with a bar material having two inner connecting parts.
Figure 3B:
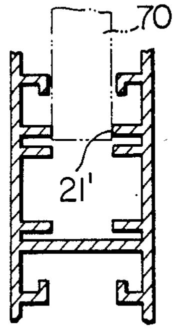
Figure 3C:
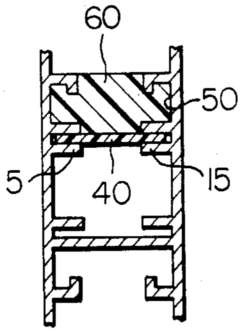
Figure 3D:
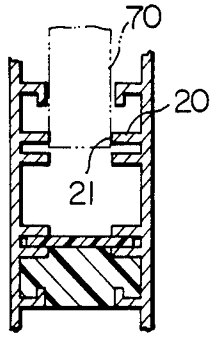
Figure 3E:
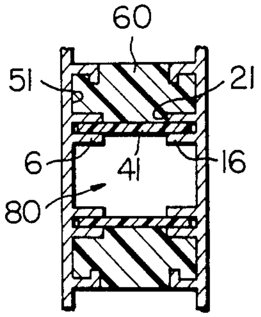

As is illustrated in FIG. 3*b*, the first step is the removal of at least part of the inner connecting part 20′ over whole length thereof by thrusting a cutter 70 from the opening between the peripheral flanges 3, 13 and then, as is illustrated in FIG. 3*c*, a strip of sheet 40 made of a heat insulating material is placed on and bridging the intermediate flanges 5, 15 but below the sections 21, 21 of the inner connecting part 20′ to form a groove-like channel 50 which is then filled with a pourable heat insulating material 60 to cover the surface of the sections of the inner connecting part 20′. Subsequent steps illustrated in FIGS. 3*d* and 3*e* are just the same as the steps illustrated in FIGS. 1*d* and 1*f* so that detailed description of the steps need not be repeated here.

Figure 4A:
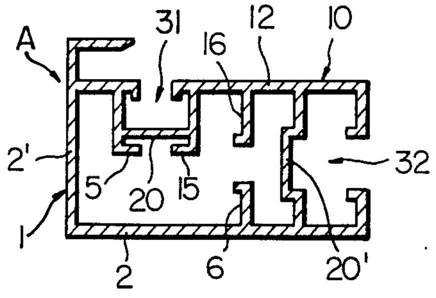
FIGS. 4*a* to 4*d* each illustrate a step of the inventive method for manufacturing a sash bar used for a meeting stile.

FIGS. 4*a* to 4*d* each illustrate one of the steps for manufacturing a heat insulating sash bar used, for example, in the meeting stile of a sliding door. FIG. 4*a* illustrates a cross section of the starting bar material A. Although the general cross sectional configuration of the bar material appears to be quite different from those illustrated in the previously referenced figures, the principle of the manufacturing steps in this case is not different from that in FIGS. 3*a* to 3*e*.

As is shown in FIG. 4*a*, one of the face members 1 of the bar material A has an L-shaped cross section instead of a single plate with only one of the branches 2 facing the other face member 10 and the other branch 2′ being perpendicular to the face member 10. These face members 1, 10 are connected together with two inner connecting parts 20, 20′ to form two groove-like channels 31, 32, respectively, one opening toward the interior side of the door and the other in the sliding direction of the door, with the respective inner connecting parts 20, 20′ as the bottoms thereof.

Figure 4B:
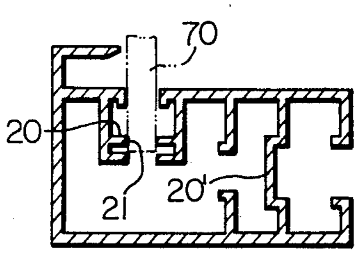
Figure 4C:
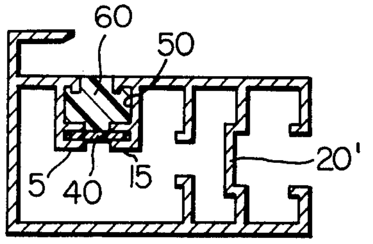

The first step is, as is illustrated in FIG. 4*b*, the removal of at least part of the inner connecting part 20 by thrusting a cutter 70 into the groove-like channel 31 over whole length of the connecting part 20 to form the sections 21 of the connecting part 20. The next step is, as is shown in FIG. 4*c* which corresponds to FIG. 3*c* in the previous embodiment, placing a belt-like strip of sheet 40 made of a heat insulating material on and bridging the flanges 5, 15 but below the sections 21 of the partly removed inner connecting part 20 followed by the impregnation of the thus formed first groove-like channel 50 with a pourable heat insulating material 60.

Figure 4D:
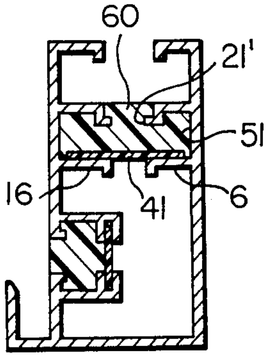

Thereafter, the other inner connecting part 20′ is at least partly removed over whole length thereof by thrusting a cutter into the groove-like channel 32 whereby the face members 1, 10 are thermally isolated from each other but joined together with the heat insulating material 60 filling the first groove-like channel 50. Further, the bar material A is turned by 90° so as to have the groove-like channel 32 opening upwardly and a second strip of heat insulating sheet 41 is placed on and bridging the intermediate flanges 6, 16 but below the sections 21′ of the partly removed connecting part 20′ to form a second groove-like channel 51 which is subsequently filled with the pourable heat insulating material 60 as is shown in FIG. 4*d*.

Figure 5A:
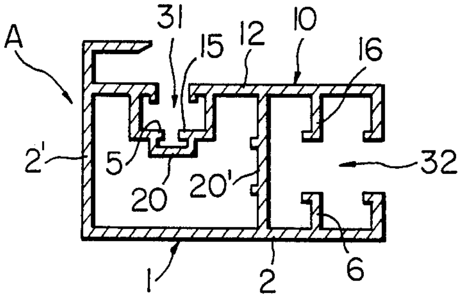
FIGS. 5*a* to 5*f* each illustrate a step of the inventive method for manufacturing a sash bar used for a meeting stile similar to that illustrated in FIGS. 4*a* to 4*d*.

FIGS. 5*a* to 5*f* each illustrate one of the steps for manufacturing a heat insulating sash bar suitable for a meeting stile similar to that illustrated in FIGS. 4*a* to 4*d*. FIG. 5*a* is a cross section of the starting bar material A. Note that the relative positions of the flanges 5, 15 to the connecting part 20 and the flanges 6, 16 to the connecting part 20′ are 20′ are reversed to those in FIGS. 4*a* to 4*d*. Different from the bar material shown in FIG. 4*a*, the flanges 5, 15 in FIG. 5*a* are positioned between the connecting part 20 and the opening of the groove-like channel 31 and the flanges 6, 16 are positioned between the connecting part 20′ and the opening of the groove-like channel 32.

Figure 5B:
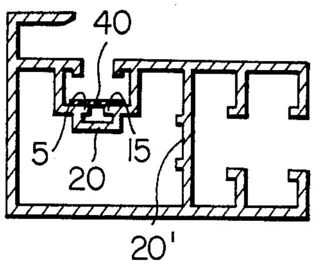
Figure 5C:
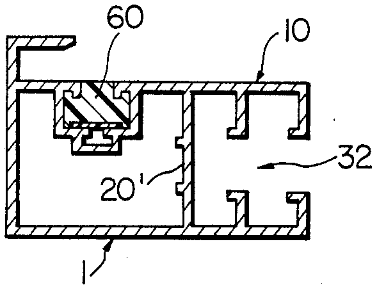

FIG. 5*b* illustrates the first step, in which a beltlike strip of sheet 40 made of a heat insulating material is placed on and bridging the flanges 5, 15 to form a raised bottom of the groove-like channel 31 which is then filled, as is illustrated in FIG. 5*c*, with a pourable heat insulating material 60 to be cured or solidified in situ.

Figure 5D:
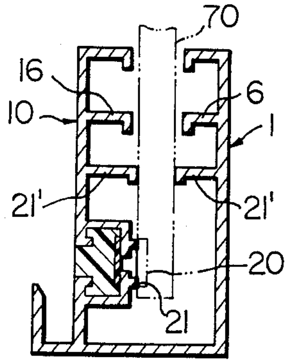

The next step to follow is at least partial removal of the connecting part 20 over whole length thereof. Different from the step illustrated in FIG. 4*b* in which the connecting part 20 is cut off with a cutter 70 thrusted into the groovelike channel 31, as is illustrated in FIG. 5*d*, a cutter 70 is thrusted from the opening of the second groove-like channel 32 first to cut off the second connecting part 20′ and then, by further thrusting beyond the sections 21′, 21′ of the connecting part 20′, to cut off the first connecting part 20. In this manner, the heat conducting paths between the face members 1, 10. are removed in one operation and the face members 1, 10 are joined together only through the cured and solidified heat insulating material 60 filling the first groove-like channel 31.

Figure 5E:
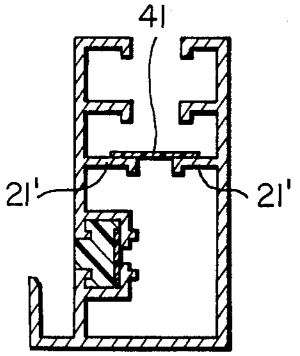
Figure 5F:
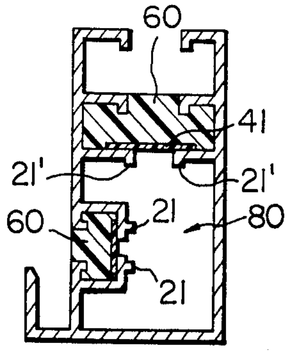

Then, the second groove-like channel 32 having the connecting part 20′ as the bottom broken through with the cutter 70 is provided with a bottom by placing a second belt-like strip of sheet 41 made of a heat insulating material on and bridging the sections 21′, 21′ as is shown in FIG. 5*e* and impregnated with a pourable heat insulating material 60 as is shown in FIG. 5*f*.

As is understood in FIG. 5*f*, the sections 21, 21 and 21′, 21′ formed by the cutting off of the connecting parts 20 20′, respectively, are not covered with the heat insulating material 60, 60 to be different from the embodiments illustrated in FIGS. 1 to 4. This matter, however, causes little problem in the protection of the sections 21, 21 and 21′, 21′ against corrosion by the atmospheric influence since these sections are all confined in the hollow space 80 and it is a relatively easy matter to seal the space 80 in order to prevent intrusion of the atmospheric moisture.

What is claimed is:

1. A method for manufacturing a heat insulating sash bar comprising two oppositely positioned face members connected with two connecting members formed of a heat insulating material therebetween which comprises the steps of (a) placing a first belt-like strip of sheet made of a heat insulating material on and bridging a first pair of two spaced oppositely positioned intermediate flanges each on one of the face members integrally connected together with at least one inner connecting part, each of the face members being provided with two intermediate flanges to form the first pair of the intermediate flanges remote from the inner connecting part and a second pair of the intermediate flanges closer to but not in direct contact with the inner connecting part with the respective oppositely positioned intermediate flanges on the other face member, to form a first groove-like channel opening at a side of the inner connecting part provided with the first belt-like strip of sheet as the bottom and with the two face plates of the face members as the side walls, (b) filling the first groove-like channel with a pourable heat insulating material to form a first connecting member which connects the face members with each other, (c) removing at least partly the inner connecting part over whole length thereof, (d) placing a second belt-like strip of sheet made of a heat insulating material on and bridging the second pair of the intermediate flanges to form a second groove-like channel including the sections of the inner connecting part having been at least partly removed and opening at the other side of the inner connecting part provided with the second belt-like strip of sheet as the bottom and with the face plates of the face members as the side walls, and (e) filling the second groove-like channel with a heat insulating material to form a second connecting member which connects the face members with each other and covers the sections of the inner connecting part having been at least partly removed.

2. A method for manufacturing a heat insulating sash bar comprising two oppositely positioned face members connected with two connecting members therebetween formed of a heat insulating material which comprises the steps of (a) placing a first belt-like strip of sheet made of a heat insulating material on and bridging a pair of flanges, each flange being on one of the face members of a bar material integrally composed of two oppositely positioned face members connected together with a first and a second inner connecting part, each inner connecting part forming the bottom of a first or a second groove-like channel with the face members as the side walls and the first groove-like channel including the pair of the flanges, to form a raised bottom of the first groove-like channel, (b) filling the first groove-like channel provided with the first belt-like strip of sheet as the raised bottom with a heat insulating material to form a first connecting member which connects the face members together with each other, (c) thrusting a cutter into the second groove-like channel to at least partly remove the second inner connecting part over whole length thereof leaving sections of the second inner connecting part, (d) thrusting further the cutter beyond the sections of the second inner connecting part having been at least partly removed to reach and cut off at least partly the first inner connecting part over whole length thereof, (e) placing a second belt-like strip of sheet made of a heat insulating material on and bridging the sections of the second inner connecting part having been at least partly removed to form a bottom of the second groove-like channel, and (f) filling the second groove-like channel with a heat insulating material to form a second connecting member which connects the face members together with each other.

* * * * *